United States Patent
Kampouris et al.

(10) Patent No.: US 8,806,264 B2
(45) Date of Patent: Aug. 12, 2014

(54) METHODS FOR DETECTING SPLIT BRAIN IN A DISTRIBUTED SYSTEM

(75) Inventors: Theocharis Kampouris, Thessaloniki (GR); Michael Jennings, Menlo Park, CA (US); Benedicto E. Garin, Jr., Hudson, NH (US); Yunrui Li, Fremont, CA (US); Vinay H. Srihari, San Mateo, CA (US); Mahesh Baburao Girkar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 410 days.

(21) Appl. No.: 12/871,798

(22) Filed: Aug. 30, 2010

(65) Prior Publication Data

US 2012/0054546 A1   Mar. 1, 2012

(51) Int. Cl.
  *G06F 11/00*   (2006.01)
(52) U.S. Cl.
  USPC .......................................................... 714/4.1

(58) Field of Classification Search
  USPC ...................................... 714/4.1, 16; 707/687
  See application file for complete search history.

(56) References Cited

U.S. PATENT DOCUMENTS

| | | | | |
|---|---|---|---|---|
| 7,739,677 | B1 * | 6/2010 | Kekre et al. ................... | 717/168 |
| 8,074,107 | B2 * | 12/2011 | Sivasubramanian et al. .. | 714/6.3 |
| 8,498,967 | B1 * | 7/2013 | Chatterjee et al. ............ | 707/674 |
| 2005/0262411 | A1 * | 11/2005 | Vertes et al. ................... | 714/741 |
| 2005/0268153 | A1 * | 12/2005 | Armstrong et al. ............... | 714/4 |

* cited by examiner

*Primary Examiner* — Yair Leibovich
(74) *Attorney, Agent, or Firm* — Hickman Palermo Truong Becker Bingham Wong LLP

(57) ABSTRACT

A method and apparatus for detecting split brain in a distributed system is provided. After determining that a rogue instance is no longer an active member of the cluster, a recovery instance detects activity associated with a redo log that is updated by the rogue instance to store log records that describe changes made by the rogue instance to data associated with the cluster.

22 Claims, 2 Drawing Sheets

METHODS FOR DETECTING SPLIT BRAIN IN A DISTRIBUTED SYSTEM

FIELD OF THE INVENTION

The present invention relates to distributed computing systems and clustered computing. In particular, the present invention is related to detecting split brain in distributed systems.

BACKGROUND

Distributed Systems

Software products may be used in a distributed computing environment to combine a set of application instances into a single entity called a cluster, all members of the cluster working together as a logical unit. For example, multiple instances of the same application may be combined into a cluster, each application instance having access to shared storage. An example of an application that may be used in a distributed system is a database management system (DBMS) such as those produced by Oracle Corporation, 500 Oracle Parkway, Redwood Shores Calif. An example of a software product that enables clustered applications is Oracle Real Application Clusters (RAC), also produced by Oracle Corporation.

The number of application instances in a cluster is not necessarily fixed. Application instances may be added and removed from a cluster for various reasons. For example, a node on which one or more application instances of the application are running may experience hardware or software problems, rendering the application instance unable to perform its duties. The node may become an inactive member, or may lose its membership in the cluster altogether. A cluster may also take on new members to help further distribute the demands being made on the cluster if the cluster has become over-burdened.

Split Brain

A split brain condition occurs when application instances in a clustered computing environment are fragmented into separate and distinct clusters where each cluster believes it is the only cluster with access to a shared resource, such as a database. Updates made by application instances in one cluster are not coordinated with updates made by application instances in other clusters, resulting in database corruption. There are at least two split brain condition categories: one-way split brain and live split brain.

A one-way split brain condition occurs when one or more members that were part of a cluster become isolated from the rest of the cluster application instances. These isolated application instances are referred to as "rogue" instances. In a one-way split brain scenario, rogue instances are not aware of their eviction from the set of members managing an application, such as a database. The remaining application instances will attempt to recover the rogue instance. However, the rogue instance continues to act as though it has not been evicted from the cluster. In database applications, this may mean that the application instance continues to generate "redo data" (i.e., change data that describes changes made to the system or shared storage) in what it believes is its current online redo log (ORL), though this log may have been altered and possibly archived by the other application instances performing recovery on behalf of the rogue instance.

A live split brain condition occurs when an application instance starts up and erroneously believes that it is the first active member of the cluster. The first application instance in a cluster often has additional duties to perform that are not performed by subsequent members. For example, in database applications, the first application instance may mount the database and perform setup activities. When a "rogue" instance erroneously believes that is the first member of the cluster and performs the duties expected to be performed only by the first member while other members continue to function properly, the new member performs its assumed duties while failing to consider the activities of existing members. As a result, multiple application instances may attempt to make changes to a shared database without proper locking, causing database corruption.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
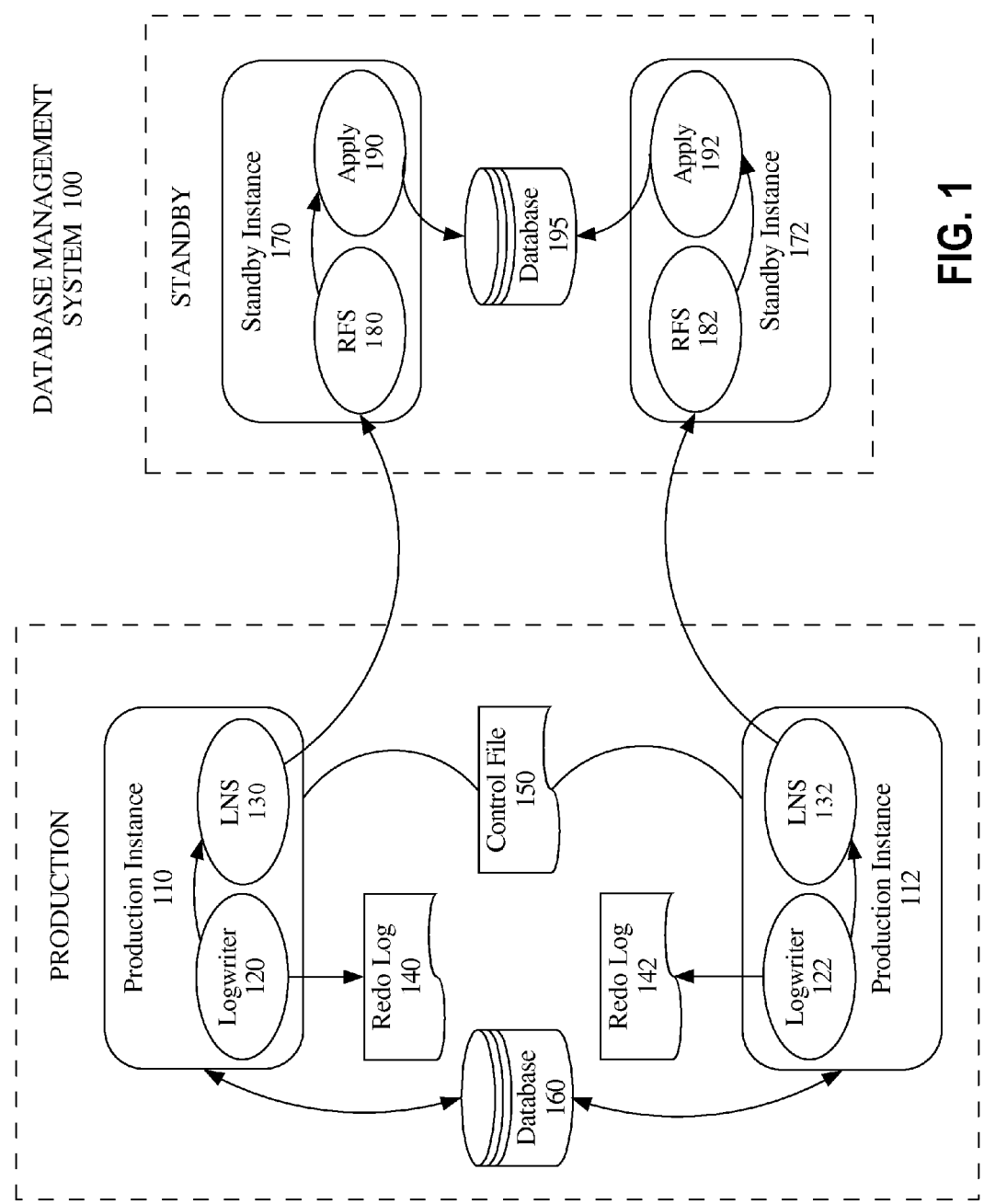
FIG. 1 is a block diagram illustrating an example database management system on which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

When a split brain condition occurs in a distributed system, multiple application instances from disjoint clusters may independently make changes to shared resources such as shared storage. Each set of independent changes are performed without regard to other sets of changes, which may lead to data corruption. For example, a first DBMS application instance may hold a lock on a data block on a shared disk. The second DBMS application instance may also hold a lock on the same data block if each application instance is unaware of the other application instance as a result of a split brain condition. Embodiments are used to detect such split brain conditions in a cluster of application instances. Once a split brain condition is detected, one or more split brain recovery procedures may be invoked.

In an embodiment, one application instance determines that another application instance is no longer an active member of the cluster. For example, this determination may be due to a detected hardware failure or other detected failure. After this determination is made, an application instance detects activity associated with a redo log for the member that was determined to be inactive. A redo log stores log records known as redo data that describe changes made by an application instance. For example, an update statement used to update a row in a database will be stored as redo data in the redo log as an indication of the change made to the database. If a redo log is being populated with records describing ongoing changes, it may be assumed that the associated application instance is active. If an application instance is active, but is thought to be inactive, that application instance is referred to as a "rogue" instance. Thus, a split brain condition is detected when an application instance is determined to be inactive, but activity associated with the redo log for that application instance continues.

Changes to the redo log may be detected by a variety of actors, at different times, and using different techniques. For example, an application instance that is part of the cluster formerly associated with the rogue instance may detect the redo log activity while performing recovery duties for the rogue instance. A standby instance used for backing up data in the (production) cluster may also detect redo activity, since redo information is periodically sent from the production system to the standby system in order to ensure data consistency.

In an embodiment, the rogue instance is the detector of the split brain condition. The rogue accomplishes this by checking certain files periodically. A control file, for example, is used in certain DBMS applications to store information about instances of the application. A control file records information describing the structure of the database and may include metadata such as the database name, names and locations of associated data files and online redo log files, the timestamp of the database creation, the current log sequence number, and checkpoint information.

Each application instance may periodically update the control file. For example, if the structure of the database changes, an application instance will update the control file to reflect the new structure of the database. When a redo log has been recovered during instance or crash recovery, the recovered redo log will be marked as closed in the control file by recovering the instance. If, while updating the control file, a rogue instance checks to see if its redo log has been closed, it will be able to detect that other application instances have labeled the rogue instance as an inactive member. This is evidenced by the closure of the redo log associated with the rogue instance, which indicates that application instance recovery has been performed for the rogue instance. The rogue instance may then invoke split brain recovery procedures.

Structural and Functional Overview

FIG. 1 is a block diagram illustrating an example database management system (DBMS) 100 on which an embodiment may be implemented. DBMS 100 includes production application instance 110 and production application instance 112, which are database server instances. Production application instances 110 and 112 may be members of a cluster in an embodiment. In another embodiment, additional application instances may be added to a cluster associated with production application instance 110 and/or production application instance 112.

In an embodiment, each production application instance is associated with a Log Writer (LGWR) process such as LGWR processes 120 and 122, a log network server (LNS) process such as LNS processes 130 and 132, and a redo log such as redo logs 140 and 142. A LGWR process is a process that writes redo data to redo logs. Redo logs are configured (created) with pre-determined sizes. The redo log that the LGWR process is writing into at any moment is also referred to as the current redo log. When the current redo log has no more space left, the LGWR switches to another redo log for writing redo data and makes that redo log the new current redo log. The previous current redo log, which is now no longer current, is then archived. Archived redo logs constitute historical redo data generated at the production database. An LNS process sends redo data being written to the current redo log by a LGWR to a standby system. Each production application instance is associated with a database, such as database 160 and a control file such as control file 150.

In an embodiment, DBMS 100 includes standby instance 170 and standby instance 172, which are database server instances. Each standby instance is associated with a remote file server (RFS) process such as RFS processes 180 and 182. A RFS process on a standby system receives redo data from one or more LNS processes on a production system. The redo data is then applied to a standby database such as database 195 by an apply process such as apply processes 190 and 192. Shipping redo data from a production system to a standby system allows the standby system to apply changes that have been made to the production system. This ensures that the data stored in the standby database is synchronized with the data stored in the production database.

There are two types of RFS processes in an embodiment. The first type of RFS process maintains a connection with an LNS process. This is called an LNS-attached RFS process. These processes can be synchronous (LGWR writes redo data to the current redo log and blocks until the RFS process has acknowledged that the same redo data has been written to the redo log at the standby) or asynchronous (LGWR writes redo data to the current redo log and continues its operations. This redo is typically shipped by the LNS to the RFS and written by the RFS to the redo log at the standby soon after, but the LGWR does not wait for this activity to finish before continuing its processing). The second type of RFS process maintains connections with a primary archiver process (not shown). This is called a non-LNS-attached RFS process. In one embodiment that uses non-LNS-attached RFS processes, LNS processes 130 and 132 are not required. While an LNS-attached RFS process receives the latest redo data from a particular redo thread and sequence number, a non-LNS-attached RFS process may only receive historical redo data that has already been generated when it is receiving redo data.

Detecting Split Brain During Instance/Crash Recovery

When a failure of any kind causes an application instance to lose its membership in a cluster, instance recovery procedures must be performed to ensure that data is not lost as a result of the failure or loss of the instance. Other members (application instances) of the cluster perform these recovery procedures. An instance performing recovery procedures may be referred to as a "recovery instance." Crash recovery is similar to instance recovery, but instead results from detecting the failure of an entire cluster. Crash recovery begins when the first member of a cluster is started following an entire cluster crash.

Multiple copies of the same file may make up the same logical redo log for redundancy purposes. Thus, a redo log may be a logical file made up of multiple copies, each copy being a separate physical file. If one copy becomes corrupt or otherwise unusable, the LGWR will remove the unusable copy from the set of copies making up the logical redo log, and write only to the remaining copies. During instance recovery or crash recovery, the recovery instance (the instance performing recovery operations) "resilvers" the online redo log of the application instance being recovered.

Resilvering refers to the act of writing each redo block having the online redo log sequence number (which uniquely identifies the redo log) back to all copies of the logical online redo log so that all copies of the logical online redo log are guaranteed to contain the same redo blocks at the online redo log sequence number.

The copies may be inconsistent with one another, but the inconsistency may not be due to a split brain condition. The inconsistency may be due to the application of the last write having completed to one copy but not to another before a crash. Resilvering by the recovery instance guarantees that all online redo log copies have the same redo blocks up to but excluding a certain block number called the next available block, which is the first block in the online redo log that has a lower sequence number than the online redo log sequence number.

In an embodiment, the recovery instance also writes a series of zero blocks at the next available block and beyond. Each block in the online redo log is assigned a sequence number. Zero blocks are simply redo blocks with a sequence number of zero, which is not a valid online redo log sequence number. The recovery instance stores the next available block and the number of zero blocks in the online redo log header when it completes recovery and marks the online redo log complete. Although zero blocks are used in an embodiment, other types of information or known patterns may be used instead of zero blocks to identify the tail of the redo log. When a split brain condition occurs, the LGWR process of a rogue instance will continue to write redo data to the online redo log associated with the rogue instance, even while recovery has been completed by a recovery instance.

Instance/crash recovery typically reads the log files of the presumably dead instances twice. This is called two-pass recovery. Writing of the series of zero blocks is done in between the two passes of log reads.

In an embodiment, the existence of a split brain condition is detected by verifying, while reading a completed online redo log, that the block image in the next available block and other zero blocks as indicated by the header of the online log match the zero block pattern. The verification will only fail in the event of a split brain condition as long as additional redo data is generated after the redo log is marked complete and before the redo log is opened. The recovery process may also detect the split brain condition using zero block verification. The recovery process will expect to see a specific number of zero sequence redo blocks (as recorded in the log file header) at the tail of the log during the second pass of reading the log. If the pattern is broken after the log has been completed, then a split brain condition has been detected.

Detecting Split Brain after Instance/Crash Recovery

If the rogue does not generate more redo data between completion of the online redo log and the second reading of the log, then instance recovery will not necessarily detect the split brain condition. But instance recovery has turned the log into a complete log that includes a zero block or other well-known pattern. An archival process associated with one of the other members will make an archive copy of the log in response to detecting the completion of the log. Between the completion of the online redo log and the archival process, the rogue instance may be generating additional redo data. If so, the archival process may then detect the split brain condition using zero block verification. The archival process, or any subsequent process that accesses the log, will expect to see the zero block at the end of the log. If the pattern is broken after the log has been completed, then a split brain condition has been detected.

A heartbeat redo may be used to ensure that something is written to the redo log, even if no actual changes are made to the database. If the rogue instance has not detected its expulsion from the cluster, it will generate a heartbeat redo, for example, every second or so. Therefore, if instance recovery takes longer than the heartbeat interval, a split brain condition will be detected by the second pass at instance recovery. If not, subsequent processes may be used to detect the additional redo data added by the rogue instance.

Detecting Split Brain Using a Control File

A control file is used in certain DBMS applications to store information about instances of the application. A control file stores data describing the structure of the database and may include metadata such as the database name, names and locations of associated data files and online redo log files, the timestamp of the database creation, the current log sequence number, and checkpoint information. A control file may also be configured to include other information.

An address for the next redo block to be written to disk from the buffer by the LGWR is maintained in the control file via periodic updates, and is maintained for each application instance. This block number is called the on-disk redo block address (RBA). The next redo block to be written to disk will be generated from redo data buffered by the LGWR process. Since the on-disk RBA is always less than or equal to the address of the actual tail of the log, the on-disk RBA may be used as a conservative estimate of the log tail location. Put another way, the on-disk RBA is the block number below which all redo data is known to be on disk.

A split brain condition check may be performed before the recovery instance updates the next available block and zero block count in the online redo log header during the final instance/crash recovery steps. The recovery instance rereads the on-disk RBA from the control file and asserts that the next available block is greater than or equal to the on-disk RBA. If the on-disk RBA is greater than the next available block then it is clear that a rogue instance must have generated and written redo data to the log during or after the recovery, which is a split brain condition.

The control file also includes an instance record for each redo thread that indicates whether that redo thread is open or closed. A redo thread is open if redo data is being generated. After instance recovery, the thread is marked as closed. Active application instances will read the control file and periodically update checkpoint information. For example, a checkpoint is created when an application instance switches log files.

A rogue instance may use this checkpoint information to detect its rogue status. In an embodiment, if a first application instance detects the failure of a second application instance, then the first application instance will perform instance recovery on the second application instance and then mark the redo thread associated with the second application instance as closed in the control file. If the second application instance is alive, then it will periodically attempt to update checkpoint information in the control file. As part of the process of updating its checkpoint the second may read the record and discover that another application instance has determined that the second application instance has failed. Split brain recovery techniques may be implemented following the detection of a split brain condition. For example, if a node detects that it is a rogue node affected by a split brain condition, that node may self-terminate.

Detecting Live Split Brain

In a live split brain scenario, an application instance starts up and erroneously believes it is the first active member of the cluster. This may occur for any number of reasons. For example, the application instance may attempt to obtain a special operating system lock that is only available to the first member. Due to a configuration error or other failure, the application instance may be granted this special lock. This instance is considered the rogue instance in a live split brain scenario.

In an embodiment, the rogue instance in a live split brain scenario will read the control file and notice an open redo thread entry for each application instance that is still running. Since the rogue instance has somehow determined that it is the first (and possibly only) active member in the cluster, the rogue instance will assume that the entire cluster previously crashed, and the rogue instance will begin performing crash recovery for each other application instance. As the rogue instance recovers each other application instance, it will perform the steps discussed above, leading to the detection of a split brain condition. The difference between one-way split brain detection and live split brain detection is that the rogue instance in a live situation remains active, and the other members are recovered; not the other way around.

For example, the rogue instance will resilver the redo logs and write a series of zero blocks at the next available block and above for each redo log. The rogue will also complete the redo logs for these other application instances. If the rogue notices additional redo data being generated for any of the completed logs, a split brain condition has been detected. All other methods discussed herein may be used in a live split brain scenario.

Detecting Split Brain Using a Standby System

Whenever there is a standby database, existing connections between a primary and standby database may be leveraged in order to facilitate split brain detection. A primary database may send redo data in real time to a standby database in an embodiment. Using this redo data, the standby may identify inconsistent information being received for distinct primary application instance sources. This data inconsistency signals that the network at the production cluster has been partitioned and the primary application instances are not coordinated.

In an embodiment, at the moment a standby is told that a particular application instance is no longer active the corresponding remote file server process should not receive redo data from the log network server (LNS) associated with the application instance anymore. This is because an inactive instance does not generate redo data. If the network file server (LNS-attached-RFS) keeps receiving redo data, then it is possible that a split brain condition has been encountered. In order to verify a split brain condition, the standby must be able to determine whether the newly received redo data is newly generated redo data from a rogue instance or just some old redo data that arrived delayed at the standby due to network vagaries. A limit may be established in the redo data stream. The limit may be used by a particular remote file server to assert that a split brain condition has been encountered when it receives redo data beyond that limit.

Crash and/or instance recovery information is transferred from a recovering primary application instance to a standby database. To do this, a new remote file server message is sent to the standby database. The message includes the application instances' thread number, sequence number, and next available block.

In response to receiving new recovery information, the standby instance propagates the information to all other standby instances. This new recovery information will allow an existing remote file server connection which is receiving current redo data from a primary database to transition into an observer role if necessary. Once transitioned, the observer remote file server will monitor all incoming redo data from the potentially isolated primary application instance. If the observer remote file server receives any redo data that violates the predetermined recovery boundaries for that transport, then it will flag a split brain situation at the standby database via alert messages and it will return a message to the isolated primary application instance causing it to abort any operation and shutdown immediately.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
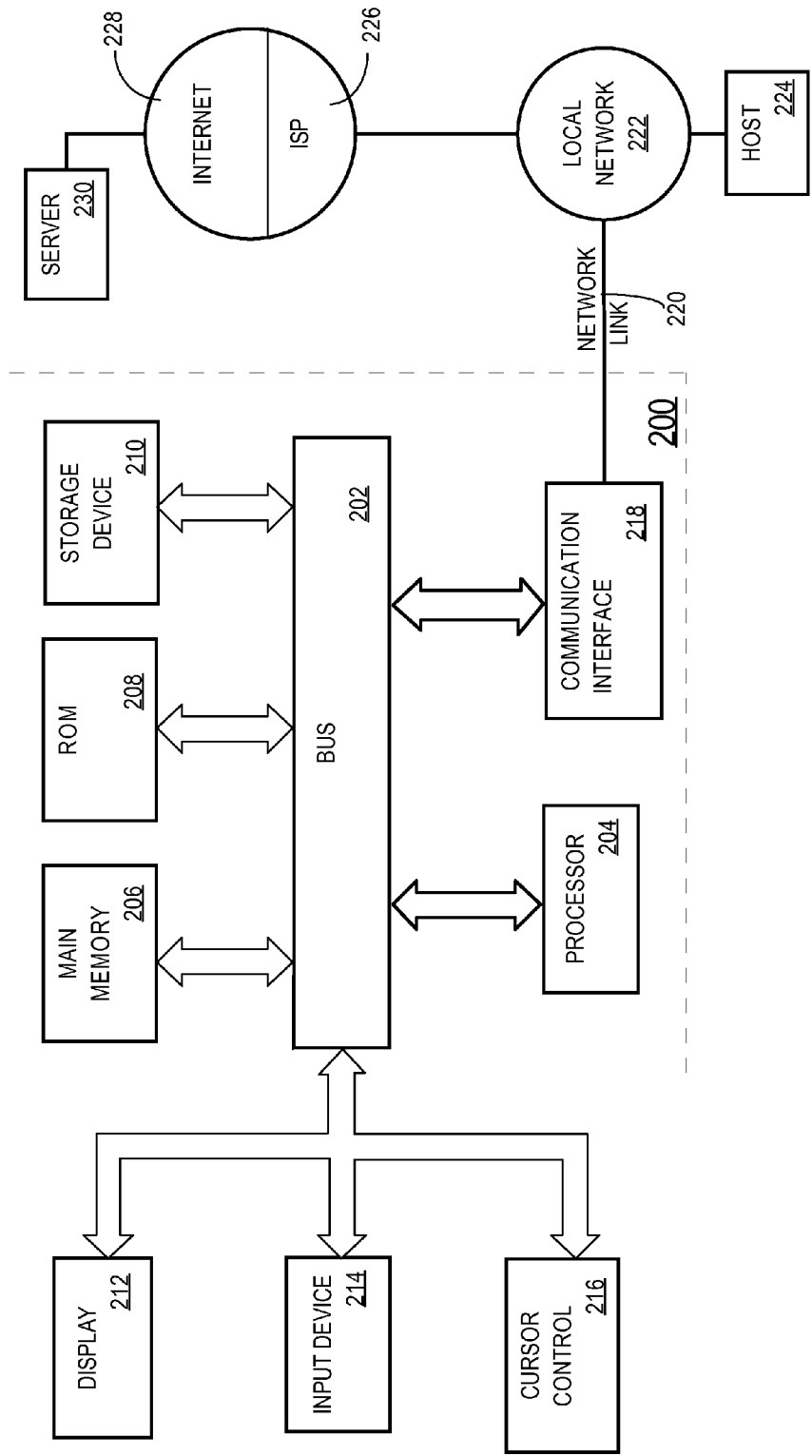
FIG. 2 illustrates a computer system upon which an embodiment may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method for detecting a split brain condition in a cluster of a plurality of instances comprising:
    determining, by one or more second instances of the plurality of instances, that a first instance of the plurality of instances is presumably no longer an active member of the cluster;
    said first instance updating a redo log with log records that describe changes made to a shared data resource by the first instance;
    performing, by the one or more second instances of said plurality of instances, instance recovery of the first instance after determining that the first instance is no longer an active member of the cluster, wherein instance recovery comprises performing a first pass of the redo log and detecting, during a second pass of the redo log, any new activity in the redo log since the first pass; and
    based on the new activity, determining that the previously-presumed inactive first instance, is an active member of a disjoint cluster;
    wherein the one or more second instances are running on one or more computing devices.

2. The method of claim 1, further comprising:
    during the first pass of said redo log, identifying an available portion of said redo log that is at or near the end of said redo log; and
    wherein detecting said split brain condition comprises, during the second pass of said redo log, detecting that additional data has been added to said available portion.

3. The method of claim 2, further comprising:
during said first pass of said redo log, writing at least one block comprising a known pattern in said available portion; and
wherein detecting that additional data has been added to said redo log comprises detecting that the known pattern has been overwritten during said second pass.

4. The method of claim 1, further comprising:
maintaining a next available block value for said redo log that indicates a block number below which all redo data is known to be stored on disk;
maintaining a redo block address value for said redo log, the redo block address value indicating an estimated on-disk location of the end of the redo log at which all redo data is known to be stored on disk; and
determining that the next available block value is less than the redo block address value after determining that the first instance is no longer an active member of the cluster.

5. The method of claim 4, wherein the next available block value and redo byte address value represent on-disk memory address values.

6. The method of claim 1, further comprising:
receiving, at one or more standby instances, an indication from the one or more second instances that the first instance is no longer an active member of the cluster;
wherein the one or more standby instances are configured to apply redo logs to a standby database;
wherein said detecting the new activity in the redo log is performed by the one or more standby instances.

7. The method of claim 1, wherein the one or more second instances includes at least one of:
a) a second instance of the plurality of instances; and
b) an instance of a standby cluster.

8. The method of claim 1,
further comprising determining, upon a specific instance of the one or more second instances joining the cluster, that the specific instance is the only active instance in the cluster;
wherein the first instance is an active instance in the disjoint cluster.

9. A method for detecting a split brain condition in a cluster of a plurality of instances comprising:
detecting, by a second instance, that a first instance of the plurality of instances in the cluster is presumably no longer an active member of the cluster, wherein the first instance comprising a first redo thread generating log records that describe changes to a shared data resource by the first instance;
updating, by the second instance, a first record in a control file associated with said first redo thread to indicate that the first redo thread is closed; and
periodically checking the control file by the first instance;
detecting, by the first instance, in the control file, the first record indicating that the first redo thread is closed;
upon detecting the first record, determining, by the first instance, that the first instance is a member of a disjoint cluster;
initiating one or more disjoint cluster recovery techniques on the first instance;
wherein the method is performed by one or more computing devices.

10. The method of claim 9, wherein detecting the first record indicating that the first redo thread is closed is performed by the first instance while attempting to update a second record in the control file.

11. The method of claim 9, wherein initiating the one or more disjoint cluster recovery techniques on the first instance is performed by the first instance itself.

12. A computer-readable non-transitory storage medium storing one or more instructions for detecting a split brain condition in a cluster of a plurality of instances, which when executed, cause one or more processors to perform:
determining, by one or more second instances of the plurality of instances, that a first instance of the plurality of instances is presumably no longer an active member of the cluster;
said first instance, updating a first redo log with log records that describe changes made to a shared data resource by the first instance;
performing, by the one or more second instances of said plurality of instances, instance recovery of the first instance after determining that the first instance is no longer an active member of the cluster, wherein instance recovery comprises performing a first pass of the redo log and detecting, during a second pass of the redo log, any new activity in the redo log since the first pass; and
based on the new activity, determining that the previously-presumed inactive first instance is an active member of a disjoint cluster.

13. The computer-readable non-transitory storage medium of claim 12, wherein the instructions further include instructions for:
during the first pass of said redo log, identifying an available portion of said redo log that is at or near the end of said redo log;
wherein detecting said split brain condition comprises, during the second pass of said redo log, detecting that additional data has been added to said available portion.

14. The computer-readable non-transitory storage medium of claim 13, wherein the instructions further include instructions for:
during said first pass of said redo log, writing at least one block comprising a known pattern in said available portion;
wherein detecting that additional data has been added to said redo log comprises detecting that the known pattern has been overwritten during said second pass.

15. The computer-readable non-transitory storage medium of claim 12, wherein the instructions further include instructions for:
maintaining a next available block value for said redo log that indicates a block number below which all redo data is known to be stored on disk;
maintaining a redo block address value for said redo log that indicates an estimated on-disk location of the end of the redo log all redo data is known to be stored on disk;
after determining that the first instance is no longer an active member of the cluster, determining that the next available block value is less than to the redo block address value.

16. The computer-readable non-transitory storage medium of claim 15, wherein the next available block value and redo byte address value represent on-disk memory address values.

17. The computer-readable non-transitory storage medium of claim 12, wherein the instructions further include instructions for:
receiving, at one or more standby instances, an indication from the one or more second instances that the first instance is no longer an active member of the cluster;
wherein the one or more standby instances are configured to apply redo logs to a standby database;

wherein detecting said new activity in the redo log is performed by the one or more standby instances.

18. The computer-readable non-transitory storage medium of claim 12, wherein the one or more second instances includes at least one of:
   a) a second instance of the plurality of instances; or
   b) an instance of a standby cluster.

19. The computer-readable non-transitory storage medium of claim 12, wherein the instructions further include instructions for
   a specific instance of the one or more second instances determining, upon joining the cluster, that the specific instance is the only active instance in the cluster;
   wherein the first instance is an active instance in the disjoint cluster.

20. A computer-readable non-transitory storage medium storing one or more instructions for detecting a split brain condition in a cluster of a plurality of instances, which when executed, cause one or more processors to perform:
   detecting, by a second instance, that a first instance of the plurality of instances is presumably no longer an active member of the cluster,
   wherein the first instance comprises a first redo thread generating log records that describe changes to a shared data resource by the first instance;
   updating, by the second instance, a first record in a control file associated with said first redo thread to indicate that the first redo thread is closed;
   periodically checking the control file by the first instance;
   detecting, by the first instance, in the control file, the first record indicating that the first redo thread is closed;
   upon detecting the first record, determining, by the first instance, that the first instance is a member of a disjoint cluster;
   initiating one or more disjoint cluster recovery techniques on the first instance.

21. The computer-readable non-transitory storage medium of claim 20, wherein detecting the first record indicating that the first thread is closed is performed by the first instance while attempting to update a second record in the control file.

22. The computer-readable non-transitory storage medium of claim 20, wherein initiating the one or more disjoint cluster recovery techniques on the first instance is performed by the first instance itself.

* * * * *

UNITED STATES PATENT AND TRADEMARK OFFICE
CERTIFICATE OF CORRECTION

PATENT NO. : 8,806,264 B2  
APPLICATION NO. : 12/871798  
DATED : August 12, 2014  
INVENTOR(S) : Kampouris et al.

Page 1 of 1

It is certified that error appears in the above-identified patent and that said Letters Patent is hereby corrected as shown below:

In the Claims

In column 12, line 12, in Claim 12, delete "instance," and insert -- instance --, therefor.

Signed and Sealed this  
Third Day of March, 2015

Michelle K. Lee  
*Deputy Director of the United States Patent and Trademark Office*